United States Patent [19]

Eberts

[11] 4,338,285
[45] Jul. 6, 1982

[54] LIQUID-LIQUID CONTACT APPARATUS

[75] Inventor: Donald H. Eberts, Scarborough, Canada

[73] Assignee: A. H. Ross & Associates, Toronto, Canada

[21] Appl. No.: 256,685

[22] Filed: Apr. 23, 1981

Related U.S. Application Data

[63] Continuation of Ser. No. 966,881, Dec. 6, 1978, abandoned.

[51] Int. Cl.³ .............................................. B01D 11/04
[52] U.S. Cl. ................................... 422/257; 422/256; 423/658.5; 210/202; 210/511
[58] Field of Search ................. 423/24, 54, 63, 70, 423/100, 112, 139, 157, 181, 658.5; 210/21, 296, 511, 202; 422/256, 257

[56] References Cited

U.S. PATENT DOCUMENTS

| | | | |
|---|---|---|---|
| 1,371,342 | 3/1921 | Bollmann | 422/256 |
| 2,361,780 | 10/1944 | Lewis | 422/257 |
| 2,682,452 | 6/1954 | Wainwright | 422/256 |
| 2,728,714 | 12/1955 | Winkler et al. | 422/257 |
| 2,825,678 | 3/1958 | Jahnig et al. | 210/21 |
| 3,097,071 | 7/1963 | Lowes et al. | 422/257 |
| 3,167,402 | 1/1965 | Samuelson et al. | 423/658.5 |
| 3,286,992 | 11/1966 | Armeniades | 259/4 |
| 3,436,342 | 4/1969 | Fujiwara et al. | 210/21 |
| 3,479,378 | 11/1969 | Orlandini et al. | 423/24 |
| 3,844,723 | 10/1974 | Takahata et al. | 422/257 |

FOREIGN PATENT DOCUMENTS 15829  8/1901  Belgium ............................. 422/256

*Primary Examiner*—Gregory N. Clements
*Attorney, Agent, or Firm*—Bacon & Thomas

[57] ABSTRACT

Mixing of two liquid phases can be advantageously conducted when the two phases are supplied at steady flow rates. Variations in the rates of supply of the phases are compensated for by pumping each liquid at a constant flow rate higher than the maximum flow rate provided by the supply, and permitting recirculation of disengaged phase in the amount necessary to meet the demand of the system.

10 Claims, 5 Drawing Figures

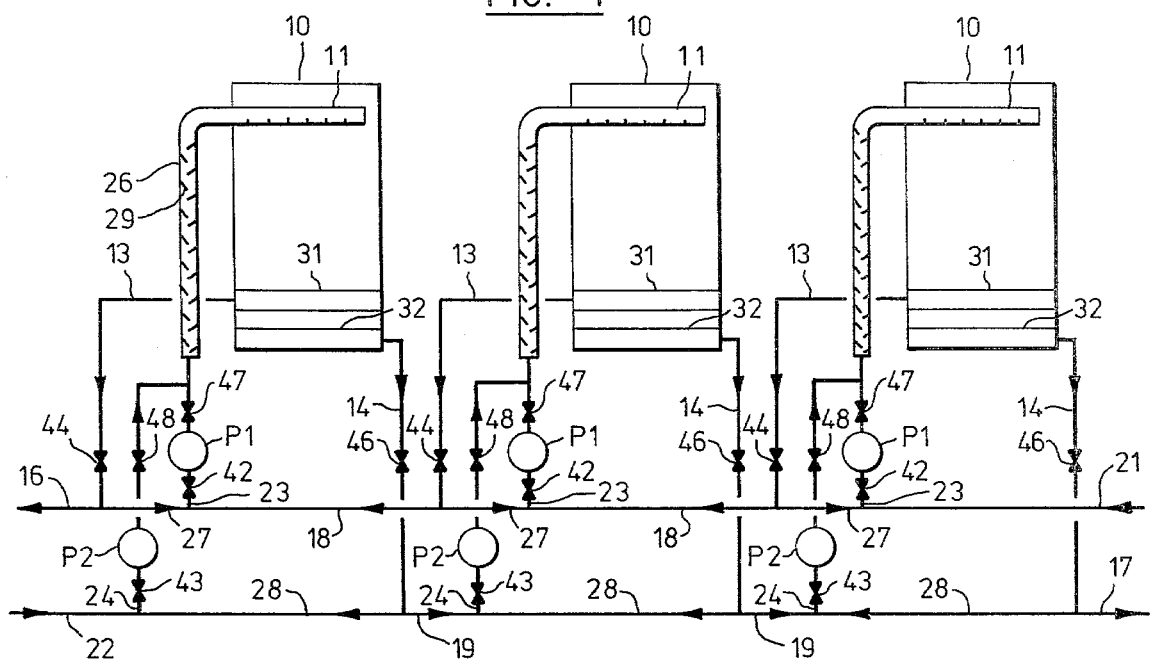
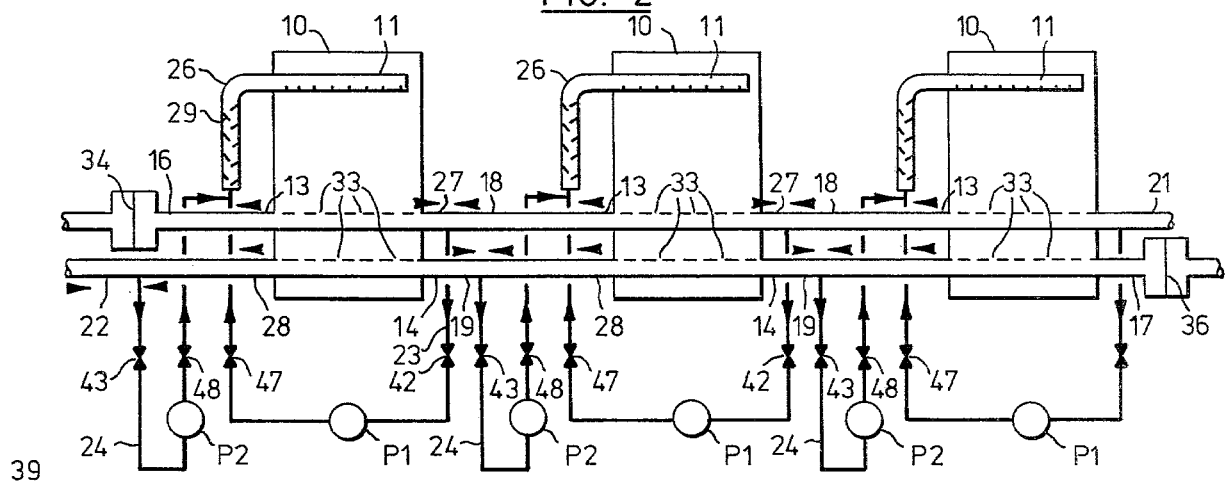
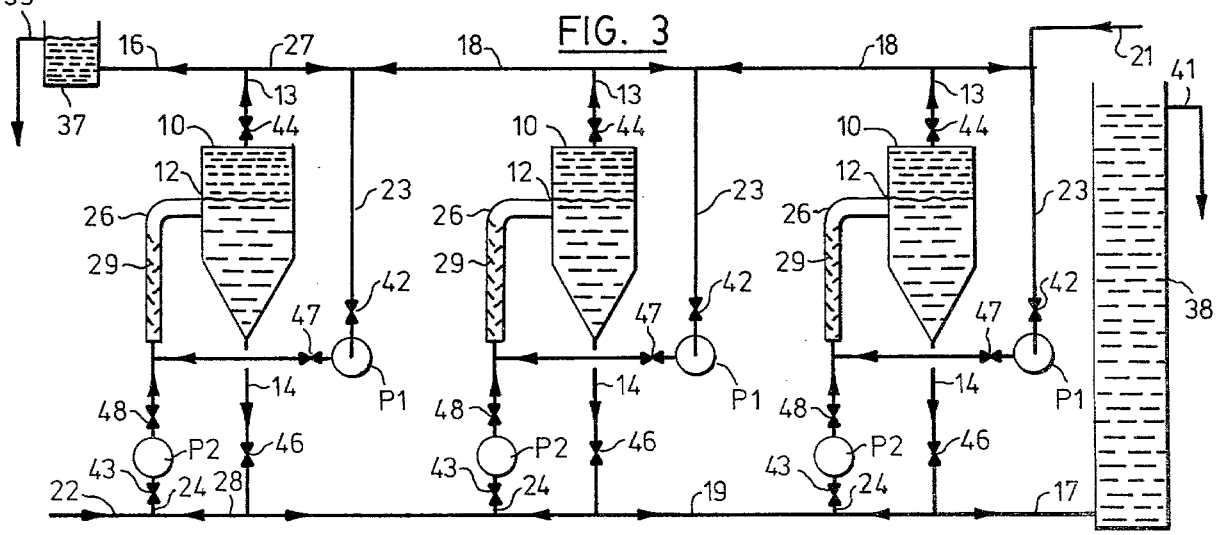

LIQUID-LIQUID CONTACT APPARATUS

This application is a continuation of application Ser. No. 966,881, filed Dec. 6, 1978, abandoned.

BACKGROUND OF THE INVENTION

The present invention relates to processes and apparatus for carrying out liquid-liquid contacting, and more particularly to apparatus whereby such contacting may be carried out continuously.

One example of industrial application of liquid-liquid contacting processes is in liquid-liquid extraction. This entails the mixing of two substantially immiscible liquids, typically an organic and aqueous solution, wherein a component of interest transfers from one of the liquid phases to the other. After the transfer has taken place, the phases are conventionally allowed to separate through a difference in their densities in a settler vessel or other separator vessel. The mixing-settling process must usually be repeated a number of times with counter current flow of the liquids in order to obtain sufficiently complete transfer of the component of interest.

The mixing operation has generally been conducted in mechanically agitated vessels, although mixing in a common pump has been used successfully where the transfer has been sufficiently rapid. The mixed phases are directed to a settler, the size of which is determined by the rate of flow of the liquids and the rate at which the liquid phases disengage. The essential features of the conventional mixer-settlers are shown in U.S. Pat. No. 3,206,288, in the name W. C. Hazen et al, issued Sept. 14, 1965.

The rate of phase disengagement, and hence the size of the settler, is influenced by the drop sizes present in the emulsion that is produced in the mixing process, in particular the fine sizes being slower to disengage.

It has been previously proposed to employ so-called "motionless mixer" elements, which can avoid the formation of fine size droplets, for contacting the two liquid phases together.

One form of the said motionless mixers is described in U.S. Pat. No. 3,286,992 in the name Constantine D. Armeniades et al, issued Nov. 22, 1966. A solvent extraction process employing motionless mixer elements to combine the two liquid phases together has been described in Intermet Bulletin, No. 4, Volume 3, April, 1974, in an article entitled "A New Solvent Extraction System". However, as is described in the article, the flow rate of the liquid through the motionless mixer elements strongly affects the efficiency of the resulting extraction. The higher extraction efficiency that was demonstrated at higher flow velocities is considered to be the result of greater mixing intensities and of the presence of smaller drop sizes in the emulsion at higher liquid velocities. The smaller drops will, however, lead to diminished rate of phase disengagement, and will thus lead to a requirement for larger settler vessels for the separation of liquid phases. In order to obtain an emulsion containing drops of substantially constant size it is essential to feed the two liquids at a constant rate through the motionless mixer apparatus. It is moreover advantageous to provide constant flow rates of the two phases when other kinds of mixer apparatus are employed. An arrangement capable of satisfactorily achieving these constant flow rates does not appear to have been proposed prior to the present invention.

In the industrial processes to which solvent extraction techniques are commonly applied, the sources of supply of the respective liquid phases are of a nature such that each incoming stream of liquid has a flow rate that is subject to variation. The present invention provides means for overcoming the effects of such variation.

SUMMARY OF THE INVENTION

In the present invention, each liquid phase is pumped at a steady flow rate into a mixer apparatus which combines the two liquids to form a mixture which is passed into a settler vessel or other separator vessel. The separated liquid phases are withdrawn separately from the vessel, and in order to compensate for the variations in the flow rate provided by the sources of the phases, a recirculation is permitted from the outlet for each phase from the separator vessel to the pump for that phase. The pump is operated at a pumping rate in excess of the maximum flow rate provided by the source of the liquid phase, so that a certain amount of recirculation is maintained, at a rate which rises and falls with the variations in the rate of supply. The output from the pump is, with this arrangement, maintained at a steady level, and no active control elements are required to regulate the recirculating flow.

In one advantageous form of the present invention, wherein multiple liquid-liquid contacting stages are employed, the phase layers in each separator vessel are connected in direct flow communication with the corresponding phase layer in the other vessels through the outlet conduits that supply the separated phase to the subsequent stage and through auxiliary conduits that carry the recirculating flow. With this arrangement, it is possible to regulate upper level and interfacial level in all of the separator vessels using a single level controlling means for each liquid phase. The level-controlling means may conveniently be in the form of weir overflows controlling the heads of liquid in the outflows of processed liquid discharged from the first and last vessels, respectively.

BRIEF DESCRIPTION OF THE DRAWINGS

Examples of the present invention will now be more fully described, with reference to the accompanying drawings, wherein:

FIG. 1 is a partly diagrammatic plan view of multiple-stage liquid-liquid contacting apparatus in accordance with the invention;

FIG. 2 is a partly diagrammatic plan view of a second form of apparatus in accordance with the invention;

FIG. 3 is a partly diagrammatic side view, partially in section, of a further form of apparatus in accordance with the invention;

DESCRIPTION OF THE PREFERRED EMBODIMENTS

Figure 4:
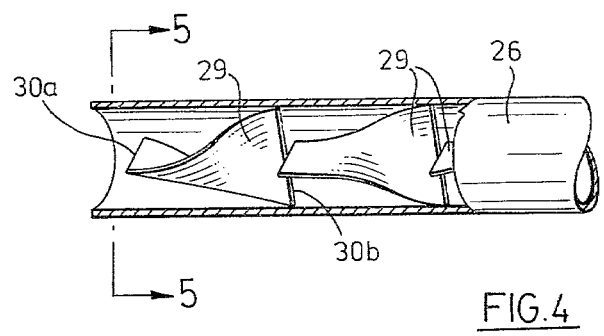
FIG. 4 shows a side view, partly in longitudinal section, of the mixer tube employed in the apparatus.

Referring to the drawings, wherein like reference numerals indicate like parts, examples of liquid-liquid contacting apparatus having three stages are shown.

Each stage in the said apparatus comprises a settler vessel 10. In the examples of FIGS. 1 and 2 the settler vessels 10 are rectangular in plan and at one end there is a perforated distributor pipe 11 through which is supplied an intimately-mixed emulsion of one liquid in another. At an opposite end there are outlet conduits 13 and 14 through which are withdrawn the upper and lower layers of liquid that separate out in the vessel. In the example of FIG. 3, there is an inlet 12 at an intermediate region for the emulsion, and the outlet conduits 13 and 14 are at the top and the bottom. In each of the examples shown in the drawings, in the first stage the outlet conduit 13 connects with a discharge conduit 16 for the lighter phase, and in the last stage, outlet conduit 14 connects with a discharge conduit 17 for the heavier phase. Otherwise, the conduits 13 and 14 connect with supply conduits 18 and 19 feeding the lighter and heavier phases respectively to adjacent stages of the apparatus. The two phases pass countercurrently between the stages.

In the last and the first stages, there are supply conduits 21 and 22 that are connected to sources of supply of the lighter and heavier liquid phases, respectively.

In each stage, the supply conduits 18, 19, 21, 22 are connected to the inlet side of pumps $P_1$ and $P_2$, for the respective phases, through inlet conduits 23 and 24. The pumps feed liquid into a mixer tube 26 that feeds liquid into the header 11 or inlet 12 for the settler vessel.

The inlet conduits 23 and 24 of the pumps $P_1$ and $P_2$ are also connected through auxiliary conduits, 27 and 28, to the outlet conduits 13 and 14, respectively.

Figure 5:
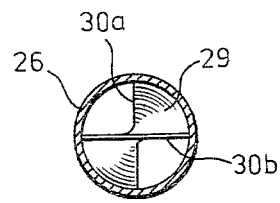
FIG. 5 shows a cross-section taken along the line 5—5 of FIG. 4.

Internally, the mixer tubes 26 are furnished with a known form of motionless mixer elements 29 shown in more detail in FIGS. 4 and 5. These mixer elements 29 are of the kind that will combine the two liquids into a substantially uniform emulsion provided the flow rates of the two liquids are maintained constant, and may be of the kind described in U.S. Pat. No. 3,286,992 referred to earlier. As described in more detail in the said patent, to which further reference should be made for details, and as shown in FIGS. 4 and 5 these mixer elements 29 each comprise a curved sheet-like element which divides the interior of the mixing tube 26 into two separate channels. The elements 29 are arranged in series longitudinally within the tube, and each element has a front transverse edges 30a and a rear transverse edge 30b, these edges being positioned at an angle to the contacting transverse edges of the adjacent elements. The elements 29 are arranged with alternating right-handed and left-handed curvature. One suitable form of mixer element is the kind available under the trade mark STATIC MIXER from Kenics Corporation, Danvers, Mass. In the preferred arrangement, each element 29 has a curvature that turns the fluid through 180° as it travels along the length of the element, and the transverse edges of each element 29 are disposed at 90° to the contacting edges of the adjacent elements. Other forms of mixer apparatus may of course be employed.

In operation, lighter and heavier liquid phases are supplied countercurrently through the supply conduits 21 and 22, respectively. These liquids may be, for example, such as are employed in the continuous countercurrent extraction of metal values from dilute and/or impure aqueous solutions containing the metal ions in simple or complex form. In such case, the heavier phase may be a pregnant aqueous solution supplied through the supply conduit 22 illustrated at the extreme left-hand side in each Figure, and the lighter phase, which may be an organic solution, and may consist of an ion exchange compound dissolved in an organic solvent, is supplied through the supply conduit 21 at the right-hand side in each Figure. The ion exchange compound preferentially absorbs the desired metal values from the aqueous solution.

Each settler tank 10 contains an upper separated phase layer, often of organic solution, and a lower separated phase layer, often aqueous. In one example, proceeding from left to right the aqueous layers in successive settler vessels will contain progressively decreasing concentrations of the ion of interest, the settler vessel at extreme right containing a barren aqueous raffinate which is discharged through the discharge conduit 17. Proceeding from right to left, the organic phase will contain progressively increasing concentrations of the ion of interest, the vessel at extreme left containing a loaded organic phase, with a relatively high concentration of the ion of interest, and the loaded organic phase is withdrawn from the discharge conduit 16. In the usual applications, the sources of supply of the liquids each provide a flow of liquid that varies between maximum and minimum limits. In order to obtain a constant output from each of the pumps $P_1$ and $P_2$, each pump is operated at a volume pumping rate which is in excess of the maximum flow rate provided by the source that supplies liquid to the pump. With this arrangement, the variations that occur in the supplies are compensated for by increased or decreased recirculation of liquid along the auxiliary conduits 27 and 28 from the streams of separated liquid that flow out from the settler tanks through the outlet conduits 13 and 14, respectively.

Thus, the flows of the liquid phases that are supplied by the pumps $P_1$ and $P_2$ to the mixer tube 26 in each stage, are each maintained at uniform and constant rates. As a result, the motionless mixer elements combine the two liquids into a substantially uniform emulsion, containing drops of substantially uniform size of one liquid phase distributed throughout a continuous phase of the other liquid, with the attendant advantage that as there is substantially no production of fine drops that are excessively slow to disengage. This permits settler vessels of small capacity to be employed, as it is possible to reduce the residence times therein.

It will be appreciated that in applications where the supply of only one of the liquid phases is subject to variation, it is not necessary to recirculate liquid to the set of pumps $P_1$ and $P_2$ that handle the other liquid. Thus, for example, if a constant flow is supplied through right-hand conduit 21, there is no need for an auxiliary connection 27 between the outlet and supply conduits 13 and 18.

It will be noted from FIG. 1 that the outlets for the lighter phase from each vessel are connected together through a continuous line of conduits comprising the outlet conduits 13, the supply conduits 18, and the auxiliary conduits 27. Similarly, the outlets for the heavier phase are each linked together through outlet conduits 14, supply conduits 19, and the auxiliary conduits 28. Thus, although in FIG. 1 the levels of liquids are controlled through a conventional overflow weir arrangement, in which the upper phase overflows a weir 31 and the lower phase overflows a weir 32 set at a lower level, it is instead possible to control the upper and interfacial levels of the liquid phases in each vessel 10 by controlling the respective heads of liquid in the discharge conduits 16 and 17.

FIG. 2 illustrates an arrangement of apparatus in which this principle is carried into effect, with the liquids being withdrawn from the vessels through outlets which are in direct flow communication with the liquids in the vessels, instead of passing through a discontinuity such as a weir.

In the embodiment of FIG. 2 two conduits, one at a higher level than the other, run continuously through each vessel 10, and, proceeding from left to right, successive sections of the upper of these two conduits, which carries the lighter (usually organic) phase, constitute the discharge conduit 16, the outlet conduit 13, and the auxiliary conduit 27, and the supply conduit 13, and, in the last stage, supply conduit 21. In the lower of the two conduits, which carries the heavier phase (usually aqueous), successive sections, proceeding from left to right in FIG. 2, constitute the supply conduit 22, the auxiliary conduit 28, the outlet conduit 14, the supply conduit 19, and, in the last stage, the discharge conduit 17. Each conduit is formed with orifices 33 in the region extending within the vessels 10, and the orifices in the upper of the two conduits serve as collectors through which the upper, lighter liquid phase is withdrawn from the vessel, while the heavier phase is withdrawn through the orifices in the lower conduit.

The discharge conduits 16 and 17 from the first and last stages are connected to respective level-controlling means. As illustrated schematically in FIG. 2, these, in the simplest form may comprise a weir overflow, comprising weirs 34 and 36 which maintain a certain head of liquid in the discharge conduits 16 and 17, respectively, and in each of the settler vessels.

Since the volume flow rates drawn by pumps $P_1$ and $P_2$ through inlet conduits 23 and 24 are in excess of the maximum flow rates supplied through the supply conduits 18 and 21 on the one hand and 19 and 22 on the other, a small, although variable, flow of recirculated liquid will always be maintained through the auxiliary conduits 27 and 28. Thus, although the settler vessels 10 in FIG. 2 are directly inter-connected through the continuous conduits, the small, but positive liquid flows through the auxiliary conduits 27 and 28 effectively isolate the separated liquid layers in each stage from the separated liquid layers in the adjacent stages, so that there is no possibility of loss of staging through back mixing of separated liquid from one settler vessel into the separated liquid layer in the adjacent settler vessel.

FIG. 3 illustrates the principles of the invention applied to a continuous liquid-liquid contacting system in which there is vertical movement of the phases within the settler vessel, rather than horizontal movement and there are outlets for the lighter and heavier phases at the top and bottom. Predetermined heads of lighter phase liquid and heavier phase liquid are maintained in tanks 37 and 38 connected to the discharge conduits 16 and 17 for the lighter and heavier phases, respectively, and the heads of liquid are maintained by overflows 39 and 41 located at a certain height in the tanks 37 and 38 respectively.

An advantage of the arrangements above described is that they are adapted to operate with by-pass of the liquids around any selected stage of the apparatus in the case of a failure in that stage.

In order to facilitate by-passing of a failed stage, the pumps $P_1$ and $P_2$ are provided with isolation valves, 42 and 43, respectively, in their inlet conduits 23 and 24 for isolating the pumps from their supply and auxiliary conduits. On closure of the isolation valves 42 and 43 in a particular stage, that stage will be by-passed and the liquid will flow to the next succeeding stage in the apparatus.

In the embodiments of FIGS. 1 and 3, further isolation valves 44 and 46 are connected in the outlet conduits 13 and 14, respectively. On closure of these valves and the pumps isolation valves 42 and 43, it is possible to drain the settler vessel 10, thus making it possible to effect repairs in a settler vessel without disturbing the operation of the remaining stages in the apparatus. Throttling valves 47 and 48 may be connected to the output sides of the pumps $P_1$ and $P_2$, which may be employed for initial fine adjustment of the volume pumping rates provided by the pumps $P_1$ and $P_2$. These valves 47 and 48 can be shut off to prevent back flow if it is desired to carry out repair work on the pumps.

The pumps to be employed in the present apparatus pumps should, of course, be of a kind that is capable of maintaining a consistent volume pumping rate over prolonged periods. Suitably, these pumps will be conventional propeller pumps or centrifugal pumps of the kind normally used in chemical and similar process industries.

What I claim as my invention is:

1. Liquid-liquid contacting apparatus comprising a first stage, at least one intermediate stage, and a last stage, each stage comprising:
    (a) first and second pumps for pumping respectively a first liquid having a first characteristic density and a second liquid having a second characteristic density greater than said first density, each pump having an outlet and an inlet:
    (b) a liquid-liquid mixer apparatus connected in common to the outlets of said pumps, and having an outlet for a liquid-liquid mixture;
    (c) a separator vessel having an inlet connected to the outlet of said mixer apparatus for receiving a liquid-liquid mixture from said mixer apparatus and having a first vessel outlet for a disengaged liquid phase of said first characteristic density and a second vessel outlet for a disengaged liquid phase of said second characteristic density.
    (d) first and second outlet conduits connected to said first and second vessel outlets, respectively, and
    (e) a first auxiliary conduit connected between the first outlet conduit and the inlet to the first pump and a second auxiliary conduit connected between the second outlet conduit and the inlet to the second pump; said liquid-liquid contact apparatus also including sources of supply of said first and second liquids, respectively, a first supply conduit connecting the source of supply of said first liquid to the inlet of said first pump in said last stage, a second supply conduit connecting the source of supply of said second liquid to the inlet of said second pump in said first stage, said first outlet conduit in the last stage and said first outlet conduit in said at least one intermediate stage also connecting said first vessel outlet in each stage to the inlet of the first pump in the preceding stage, said second outlet conduit in the first stage and said second outlet conduit in said at least one intermediate stage connecting said second vessel outlet in each stage to the inlet of the second pump in the succeeding stage, a first discharge conduit connected to the first outlet conduit in the first stage, and a second discharge conduit connected to the second outlet conduit in the last stage; and said first pump in said last stage having a valve interposed between it and a point of connection between the first supply conduit and the first auxiliary conduit in said last stage;

said first pump in said at least one intermediate stage and in said first stage having a valve interposed between it and a point of connection between the first auxiliary conduit of said stage and the first outlet conduit of the succeeding stage; said second pump in said first stage having a valve interposed between it and a point of connection between the second supply conduit and the second auxiliary conduit in said first stage; and said second pump in said at least one intermediate stage and in said last stage having a valve interposed between it and a point of connection between the second auxiliary conduit of said stage and the second outlet conduit of the preceding stage, whereby said pumps can be isolated from the supply, outlet and auxiliary conduits, permitting bypass of selected stages.

2. Apparatus as claimed in claim 1 including a liquid level controlling means connected to said first outlet conduit of said first stage, for controlling the level of said first liquid in each of the separator vessels.

3. Apparatus as claimed in claim 1 including liquid level-controlling means connected to the first outlet conduit of said stage and to the second outlet conduit of said last stage for controlling the levels of said liquids in each separator vessel.

4. Apparatus as claimed in claims 2 or 3, wherein said level-controlling means comprise a weir overflow.

5. Apparatus as claimed in claim 1, wherein each separator vessel is a horizontally extending vessel having its inlet for the liquid-liquid mixture at one end and said first and second outlets for disengaged phases at the opposite end.

6. Apparatus as claimed in claim 1, wherein each separator vessel is a vertically extending vessel having said inlet for liquid-liquid mixture in an intermediate part and said first and second outlets spaced vertically above and below the inlet.

7. Apparatus as claimed in claim 1, wherein said inlet for liquid-liquid mixture in the separator vessel comprises a perforated distributor pipe extending horizontally across the vessel.

8. Apparatus as claimed in claim 1, wherein each liquid-liquid mixer apparatus comprises motionless mixer elements.

9. Apparatus as claimed in claim 1, in which each liquid-liquid mixer apparatus comprises a mixer tube furnished internally with motionless mixer elements comprising curved sheet-like elements dividing the tube into two separate channels, said elements being arranged in series longitudinally with the tube, the edges of each element transverse the tube being positioned at an angle to the contacting edges of the adjacent elements, and the elements being arranged in alternating right-handed and left-handed curvature, said mixer apparatus being adapted to convert steady streams of liquid into a highly uniform emulsion containing drops having a narrow range of particle size.

10. Liquid-liquid contacting apparatus comprising a first stage, at least one intermediate stage, and a last stage, each stage comprising:
 (a) first and second pumps for pumping respectively a first liquid having a first characteristic density and a second liquid having a second characteristic density greater than said first density, each pump having an inlet and an outlet;
 (b) a liquid-liquid mixer apparatus connected in common to the outlets of said pumps and having an outlet for a liquid-liquid mixture;
 (c) a separator vessel having an inlet connected to the outlet of said mixer apparatus through which the vessel receives a liquid-liquid mixture from said mixer apparatus, the vessel containing first and second disengaged liquid phases of said first and second characteristic densities;
 (d) a first inlet conduit connected at one of its ends to the inlet of the first pump; and
 (e) a second inlet conduit connected at one of its ends to the inlet of the second pump; the liquid-liquid contact apparatus also including sources of supply of said first and second liquids; a first continuous horizontal pipe connected at one end to the source of supply of said second liquid and extending through the first, each intermediate and the last separator vessel to a discharge point beyond the last separator vessel; a second continuous horizontal pipe connected at one end to the source of supply of said first liquid and extending through the last, each intermediate and the first separator vessel to a discharge point beyond the first separator vessel; said first and second pipes extending at vertically spaced levels and the first pipe having collector orifices in each separator vessel in contact with the first disengaged liquid phase and the second pipe having collector orifices in each separator vessel in contact with the second disengaged liquid phase; in the last stage the other of the ends of the first inlet conduit being connected to first horizontal pipe at a point between the source of supply of the first liquid and the last separator vessel; in each intermediate stage and in the first stage the first inlet conduit being connected at the other of its ends to the horizontal pipe at a point between the separator vessel of the respective stage and the separator vessel of the succeeding stage; in the first stage the other of the ends of the second inlet conduit being connected to the horizontal pipe at a point between the source of supply of the second liquid and the first separator vessel; and in each intermediate stage and the last stage the other of the ends of the second inlet conduit being to the second horizontal pipe at a point between the separator vessel of the respective stage and the separator vessel of the preceding stage.

* * * * *